United States Patent
Shibata et al.

(10) Patent No.: US 8,174,604 B2
(45) Date of Patent: May 8, 2012

(54) SOLID-STATE IMAGING APPARATUS

(75) Inventors: Masanori Shibata, Ayase (JP);
Masahiro Kobayashi, Tokyo (JP); Shin Kikuchi, Isehara (JP); Hiroki Hiyama, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/238,434

(22) Filed: Sep. 21, 2011

(65) Prior Publication Data

US 2012/0006975 A1     Jan. 12, 2012

Related U.S. Application Data

(62) Division of application No. 12/437,796, filed on May 8, 2009, now Pat. No. 8,045,034.

(30) Foreign Application Priority Data

Jun. 6, 2008   (JP) .................................. 2008-149894

(51) Int. Cl.
    *H04N 5/335*   (2011.01)
(52) U.S. Cl. ........................................................ 348/308
(58) Field of Classification Search .................. 348/308, 348/294, 302; 257/290, 291; 250/208.1
    See application file for complete search history.

(56) References Cited

U.S. PATENT DOCUMENTS

| | | | |
|---|---|---|---|
| 7,292,276 B2 * | 11/2007 | Egawa et al. | ................. 348/308 |
| 7,321,110 B2 | 1/2008 | Okita et al. | |
| 7,408,210 B2 | 8/2008 | Ogura et al. | |
| 7,460,162 B2 | 12/2008 | Koizumi et al. | |
| 7,462,810 B2 | 12/2008 | Kobayashi et al. | |
| 7,550,793 B2 | 6/2009 | Itano et al. | |
| 7,554,591 B2 | 6/2009 | Kikuchi et al. | |
| 7,623,173 B2 * | 11/2009 | Nitta et al. | ..................... 348/302 |
| 2005/0264665 A1 | 12/2005 | Endo et al. | |
| 2006/0043440 A1 | 3/2006 | Hiyama et al. | |
| 2006/0044439 A1 | 3/2006 | Hiyama et al. | |
| 2008/0024630 A1 | 1/2008 | Hiyama et al. | |
| 2008/0029787 A1 | 2/2008 | Watanabe et al. | |
| 2008/0055445 A1 | 3/2008 | Hatano et al. | |
| 2008/0273093 A1 | 11/2008 | Okita et al. | |
| 2009/0073298 A1 | 3/2009 | Ogura et al. | |
| 2009/0219429 A1 | 9/2009 | Ogura et al. | |

FOREIGN PATENT DOCUMENTS

JP     5-048460 A     2/1993

* cited by examiner

*Primary Examiner* — Hung Dang
(74) *Attorney, Agent, or Firm* — Fitzpatrick, Cella, Harper & Scinto

(57) ABSTRACT

A solid-state imaging apparatus comprises first accumulation units, of which number is n, holding a digital value of n-bits output from a counter, second accumulation units, of which number is n, holding the digital value of n-bits transferred from the first accumulation units, of which number is n, and an A/D converter writing the digital value of n-bits from the counter based on an image signal generated by pixels into the first accumulation units, of which number is n, wherein correspondingly to each column of the pixels, the first accumulation unit of m-th bit ($1 \leq m \leq n$) and the second accumulation unit of m-th bit ($1 \leq m \leq n$) are arranged and paired, and the pairs of which number is n are arranged in a direction along the column of pixels.

8 Claims, 7 Drawing Sheets

SOLID-STATE IMAGING APPARATUS

This is a division of U.S. patent application Ser. No. 12/437,796, filed May 8, 2009, now U.S. Pat. No. 8,045,034.

BACKGROUND OF THE INVENTION

1. Field of the Invention

The present invention relates to a solid-state imaging apparatus.

2. Description of the Related Art

In recent years, the number of pixels of a solid-state imaging apparatus has been increased for enhancement of the quality of photographed images, in an image input apparatus such as a digital still camera and a digital video camera. Further, the solid-state imaging apparatuses, which are loaded with A/D converters to realize digital output, come out.

As one example of the A/D conversion type which is loaded on a solid-state imaging apparatus, there is a column A/D conversion type. As the prior art document, Japanese Patent Application Laid-Open No. H05-48460 (Patent Document 1) is cited. Its circuit configuration is illustrated in the drawing.

A column A/D conversion type has A/D converters 9 at respective columns of pixels and operates them in parallel, and therefore, can enhance the speed of readout of a solid-state imaging apparatus. Meanwhile, with miniaturization of pixels, serious limitations in layout are posed to the A/D converters 9 arranged at the respective columns. The configuration of a column A/D converter generally has a common counter 5 and lamp signal generating circuit, and has in each row, a comparison circuit of a sensor signal and a lamp signal, and an accumulation unit which stores data from the counter when the comparison circuit performs comparison and determination. When the number of bits of A/D conversion increases for enhancement of image quality, if processing is to be performed in the same period of time as the case where the number of bits is increased, the operation speed of the counter needs to be increased proportionally to the power of two.

Further, in the sensor loaded with column A/D converters, during A/D conversion of sensor output of a certain row, the A/D conversion data of the previous row is output, for enhancement of operation speed, and therefore, the accumulation unit which holds the conversion data of the previous row is required.

FIG. 1 of Japanese Patent Application Laid-Open No. H05-48460 is illustrated in FIG. 8. The configuration disclosed in FIG. 8 has the problem of increase in the width between the pixels because a plurality of accumulation units is arranged in the direction along the row.

SUMMARY OF THE INVENTION

An object of the present invention is to provide a solid-state imaging apparatus which can easily reduce pixel arrangement pitch in a direction along a row.

A solid-state imaging apparatus of the present invention includes a plurality of pixels for generating an image signal based on a photoelectric conversion arranged in a two-dimensional array, a counter arranged commonly to a plurality of columns of the pixels, to count and output a digital value of n-bits, a plurality of first accumulation units arranged such that the first accumulation units, of which number is n, are arranged corresponding to each column of the pixels, and each of the first accumulation units holds a digital value of one bit among digital values of n-bits output from the counter, a plurality of second accumulation units arranged correspondingly to the first accumulation units, for holding the digital value transferred from the first accumulation units, an inter-accumulation unit wiring for connecting between the first and second accumulation units, and an A/D converter for writing the digital value of n-bits from the counter based on the image signal generated by the pixels into the first accumulation units of which number is n, and is characterized in that correspondingly to each column of the pixels, the first accumulation unit of m-th bit ($1 \leq m \leq n$) among the first accumulation units, of which number is n, arranged for holding the digital value of n-bits is arranged adjacent to the second accumulation unit of m-th bit ($1 \leq m \leq n$) among the second accumulation units, of which number is n, arranged for holding the digital value of n-bits, so that the first and second accumulation units of the m-th bit are paired and the pairs of which number is n are arranged in a direction along the column of the pixels.

The pixel arrangement pitch in the direction along the row of the solid-state imaging apparatus is easily reduced.

Further features of the present invention will become apparent from the following description of exemplary embodiments with reference to the attached drawings.

DESCRIPTION OF THE EMBODIMENTS

Hereinafter, embodiments of the present invention will be described with reference to the drawings.

First Embodiment

Figure 2:
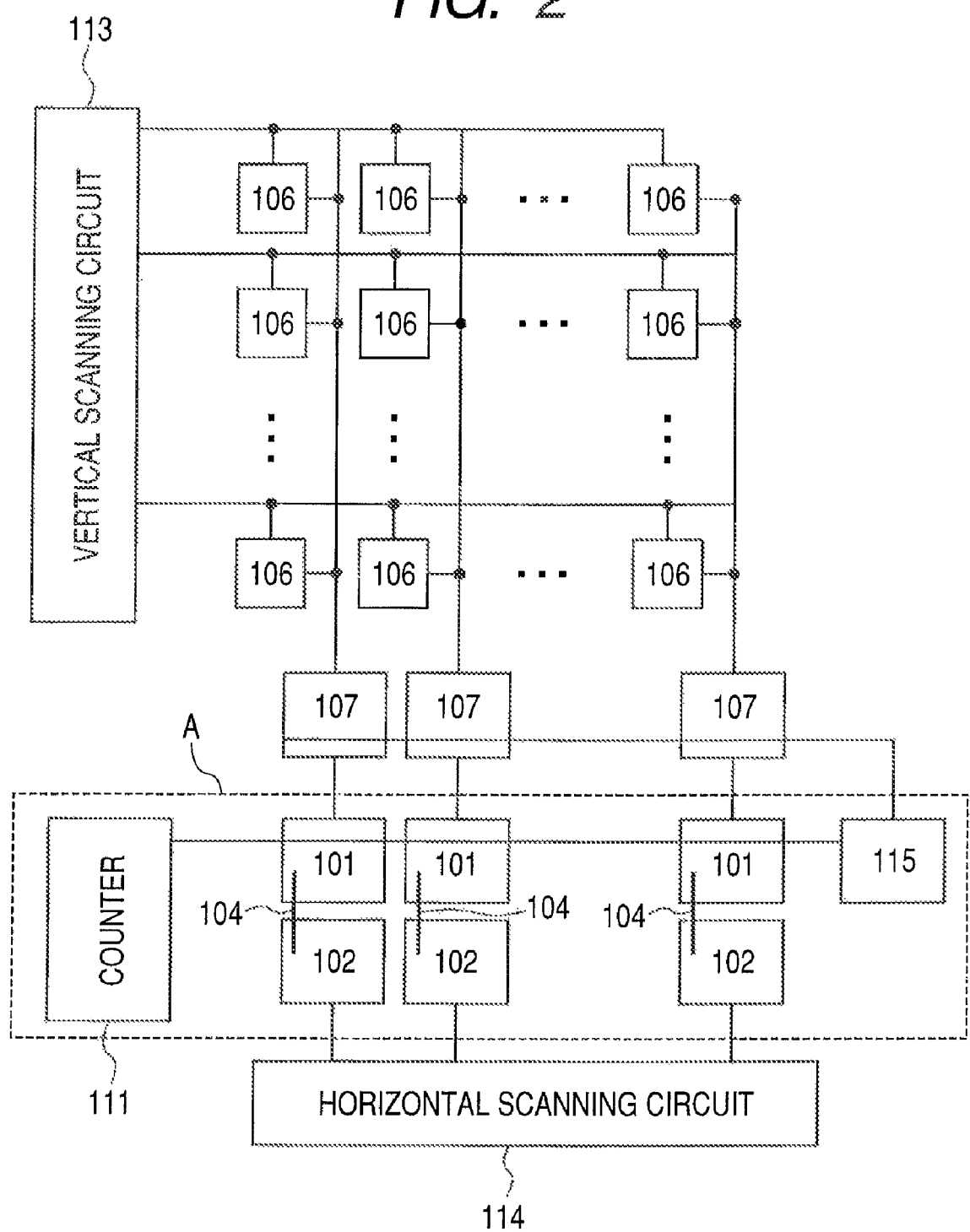
FIG. 2 is a diagram illustrating a configuration example of a solid-state imaging apparatus.

FIG. 2 is a diagram illustrating a configuration example of a solid-state imaging apparatus according to a first embodiment of the present invention. Pixels 106 are arranged in a two-dimensional array. The pixel 106 includes a photodiode, for example, and generates an image signal based on photoelectric conversion. Each of the pixels includes an amplifying unit which outputs a voltage signal based on an electric charge generated in the photodiode. A vertical scanning circuit 113 selects the pixels 106 by row unit, and reads out analog signals generating in the selected pixels 106 in A/D (analog/digital) converters 107 in a direction along a column. The A/D converter 107 is arranged at each of the columns of the pixels 106, and converts an analog signal into a digital signal. A counter 111 is arranged commonly to respective columns of the pixels 106 to count a digital signal value. First accumulation units 101, of which number is n, are arranged corresponding to each column of the pixels 106, to hold a digital value of n-bits output from the counter 111. The data of the first accumulation units 101 are sent to second accumulation units 102, of which number is n, through an inter-accumulation unit wiring 104 and are held. FIG. 2 schematically illustrates the case where n is 1.

A horizontal scanning circuit 114 outputs data accumulated in the second accumulation units 102 to a digital output unit not illustrated.

More specifically, for example, the A/D converter 107 includes a comparator which compares the output signal of the pixel 106 and a signal which is obtained by AD-converting the output value of the counter 111 in a D/A (digital/analog) converter 115. With inversion of the output from the comparator as a trigger, the output value of the counter 111 is accumulated in the first accumulation unit 101. As a result, the image signal based on the pixel 106, which is an analog signal, is converted into a digital signal, and can be accumulated in the first accumulation unit 101. Thereafter, by switch control between the first accumulation unit 101 and the second accumulation unit 102, the value accumulated in the first accumulation unit 101 is transferred to the second accumulation unit 102 and accumulated therein. Thereby, while the output signal of the pixel 106 is converted into a digital signal from an analog signal, and accumulated in the first accumulation unit 101, the digital signal in the previous row can be output to the digital output unit from the second accumulation unit 102.

Figure 1:
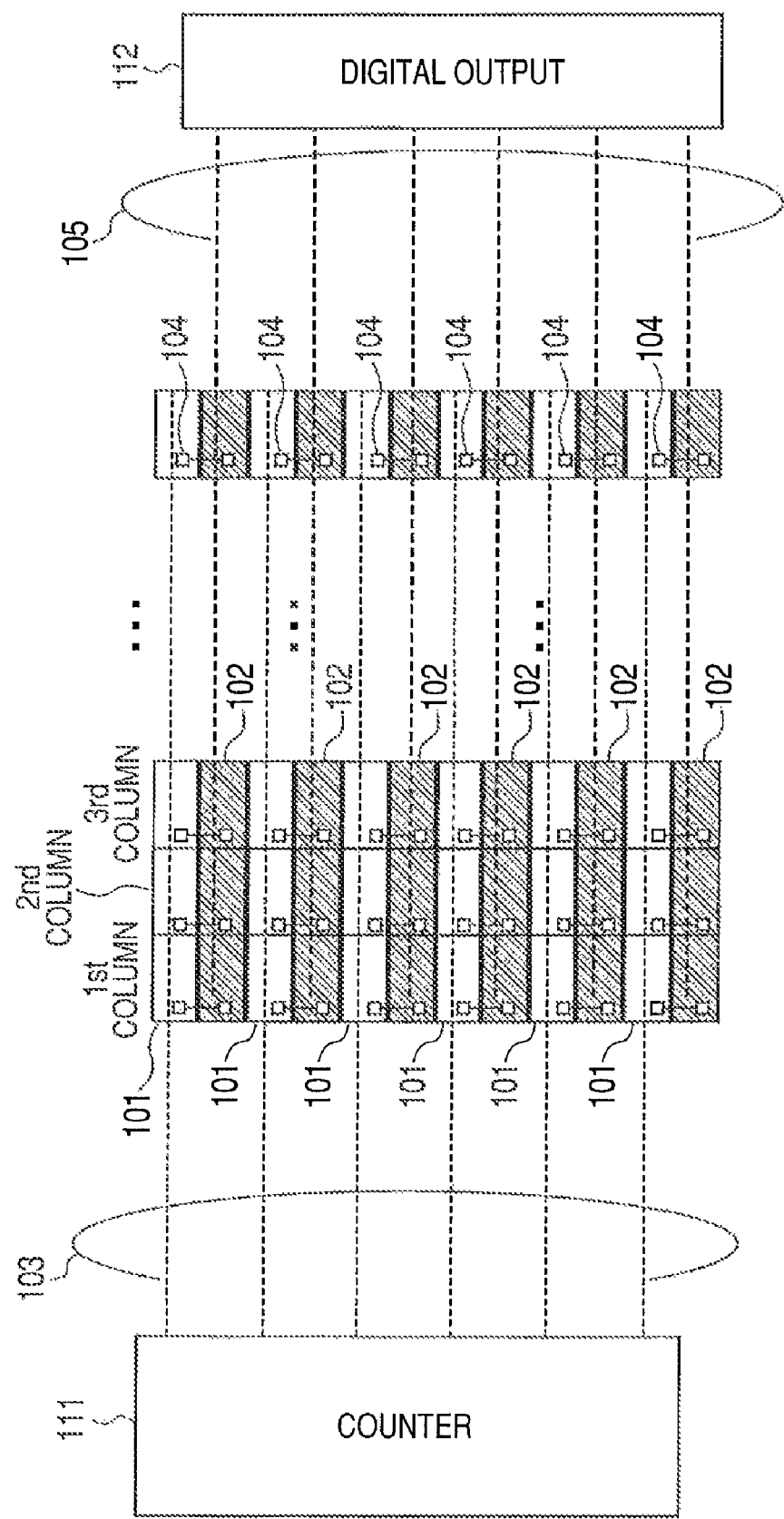
FIG. 1 is a diagram illustrating a configuration example of a first embodiment of the present invention.

FIG. 2 simplifies the first accumulation unit 101 and the second accumulation unit 102, and illustrates an example in which each column includes the first accumulation unit and the second accumulation unit corresponding to one bit, but actually, each column has the first accumulation units 101 and the second accumulation units 102 of the bits corresponding to the number of bits of A/D conversion as in FIG. 1. FIG. 1 is a diagram illustrating more detailed configuration example of a region A of FIG. 2. The counter 111 is arranged commonly to the respective columns of the pixels 106, and the digital data from the counter 111 are held in the first accumulation units 101 each corresponding to each bit through the data line 103. The data line 103 is connected between the counter 111 and the first accumulation unit 101. FIG. 1 expresses the data line 103 of 6 bits for simplification, but the data line 103 may be of any bits.

The digital data held in the first accumulation unit 101 is held in the second accumulation unit 102 through the inter-accumulation unit wiring 104.

The digital data held in the second accumulation unit 102 is output to the digital output unit 112 through the output line 105. The output line 105 is connected between the second accumulation unit 102 and the digital output unit 112. In the arranging method of the accumulation units, accumulation unit groups each made by the first accumulation unit 101 and the second accumulation unit 102 corresponding to 1 bit being arranged adjacently in a direction along the column and paired, of which number is n, are arranged in a direction along the column. The width of the first accumulation unit 101 and the second accumulation unit 102 is arranged within the width of the pixel arrangement pitch, and thereby, the pixel arrangement pitch in the direction along the row can be easily reduced.

According to the present embodiment, the accumulation unit groups are arranged in the direction along the column, and therefore, the pixel arrangement pitch in the direction along the row can be reduced.

Figure 8:
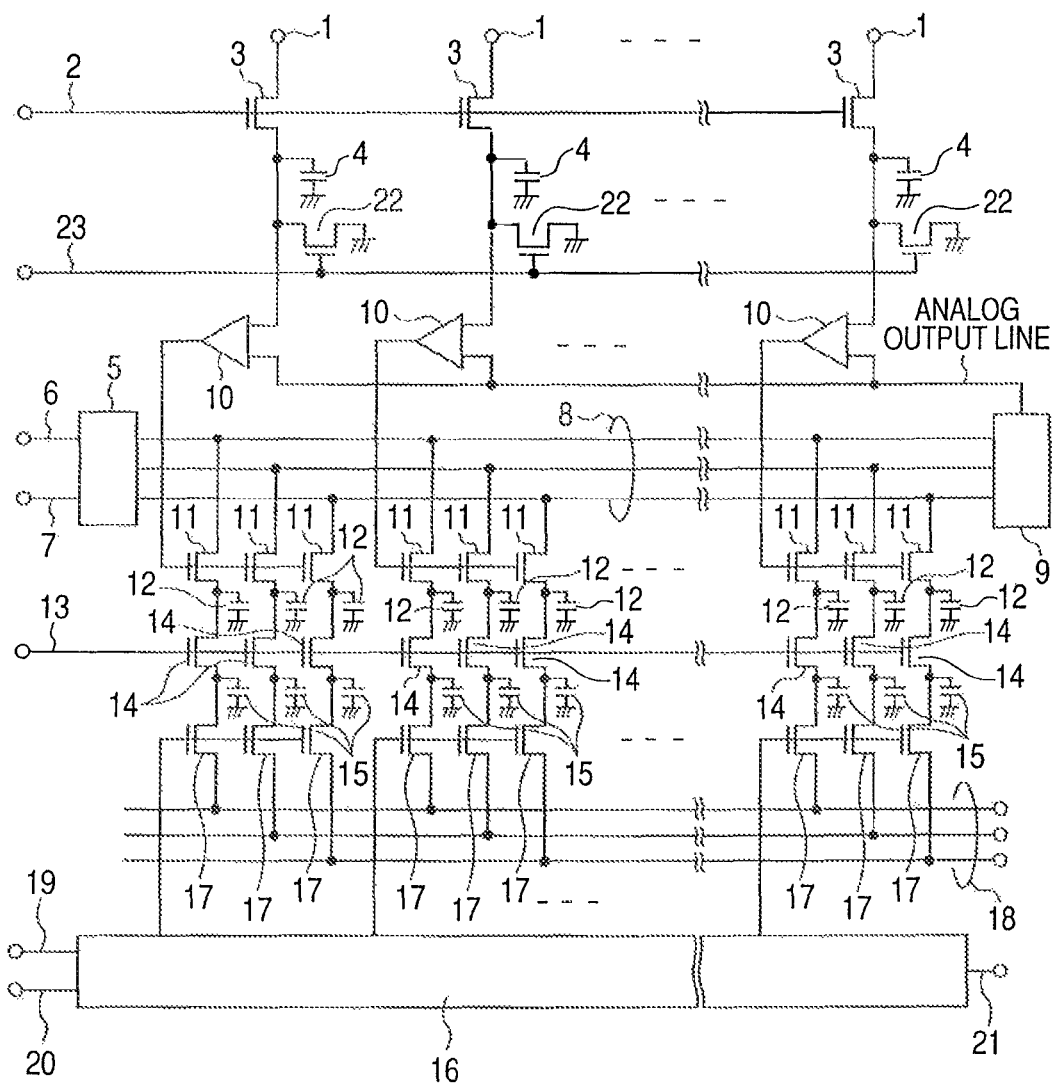
FIG. 8 is a diagram citing FIG. 1 of Patent Document 1.

Further, as shown in FIG. 8, Patent Document 1 is disadvantageous in high-speed operation since the data lines branching from the data line from the counter intersect one another, and the parasitic capacitance occurs in the intersecting portions of the data lines. Since in the present embodiment, the accumulation unit groups are arranged in the direction along the column, the data lines can connect to the corresponding first accumulation units without intersecting one another, and enhancement of operation speed can be realized.

An operation of the accumulation units is as follows. The first accumulation unit 101 holds the digital data transferred from the counter 111. The digital data held in the first accumulation unit 101 is held in the second accumulation unit 102 through the inter-accumulation unit wiring 104. The digital data held by the second accumulation unit 102 is output to the digital output unit 112 through the output line 105. While the second accumulation unit 102 outputs the digital data to the digital output unit 112, the first accumulation unit 101 holds a new digital data from the counter 111. By performing the operation of holding digital data in the first accumulation unit, and the operation of outputting the digital data from the second accumulation unit in parallel like this, operation speed can be enhanced.

Second Embodiment

Figure 3:
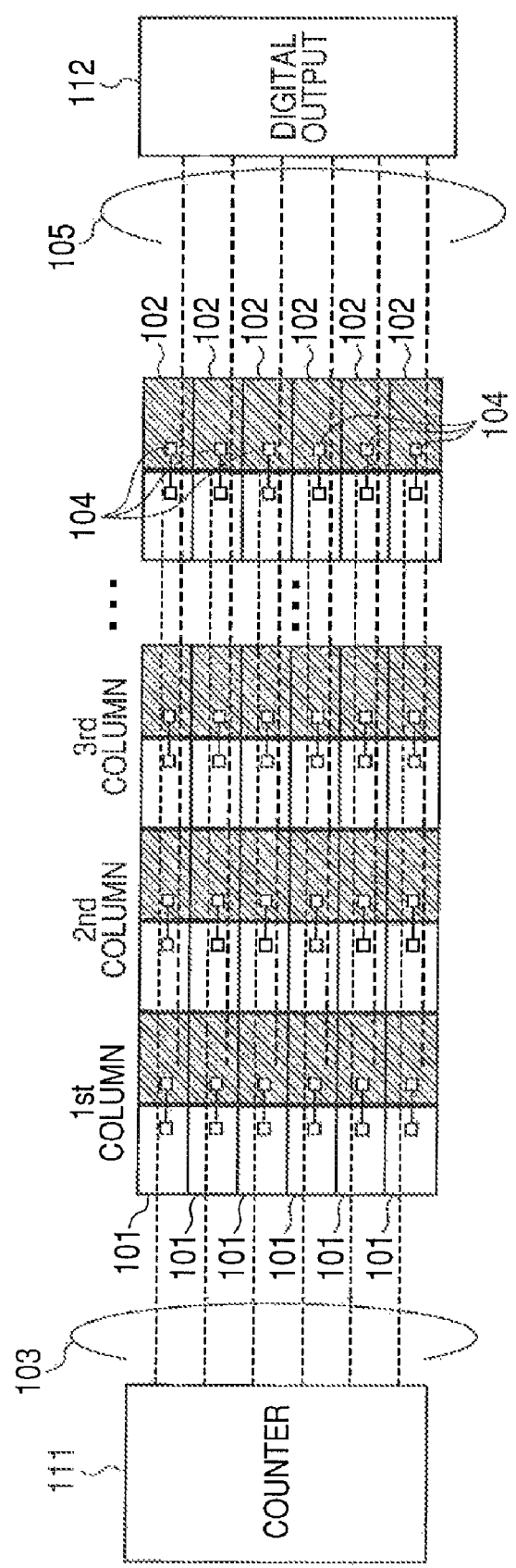
FIG. 3 is a diagram illustrating a configuration example of a second embodiment of the present invention.

FIG. 3 is a diagram showing another configuration example of the region A of FIG. 2 according to a second embodiment of the present invention. The same components as in FIGS. 1 and 2 are shown by the same reference numerals and characters. Accumulation unit groups each made by the first accumulation unit 101 and the second accumulation unit 102 arranged adjacently in a direction along the row and paired, of which number is n, are arranged in the direction along the column.

The inter-accumulation unit wiring 104 is connected between the first accumulation unit 101 and the second accumulation unit 102 adjacent in the direction along the row. The data line 103 is connected to the first accumulation unit 101. The output line 105 is connected to the second accumulation unit 102. In the present embodiment, the pixel arrangement pitch in the direction along the row also can be easily reduced by arranging each of the accumulation unit groups arranged correspondingly to each pixel column within the width of the pixel arrangement pitch.

According to the present embodiment, the accumulation unit groups are arranged in the direction along the column, and therefore, the pixel arrangement pitch in the direction along the row can be easily reduced. Patent Document 1 is disadvantageous in high-speed operation because the data lines branching from the data line from the counter intersect one another as illustrated in FIG. 8, and parasitic capacitance occurs in the intersecting portions of the data lines. Since in the present embodiment, the accumulation unit groups are arranged in the direction along the column, the data lines can connect to the corresponding first accumulation units without intersecting one another, and enhancement of operation speed can be realized.

Third Embodiment

Figure 4:
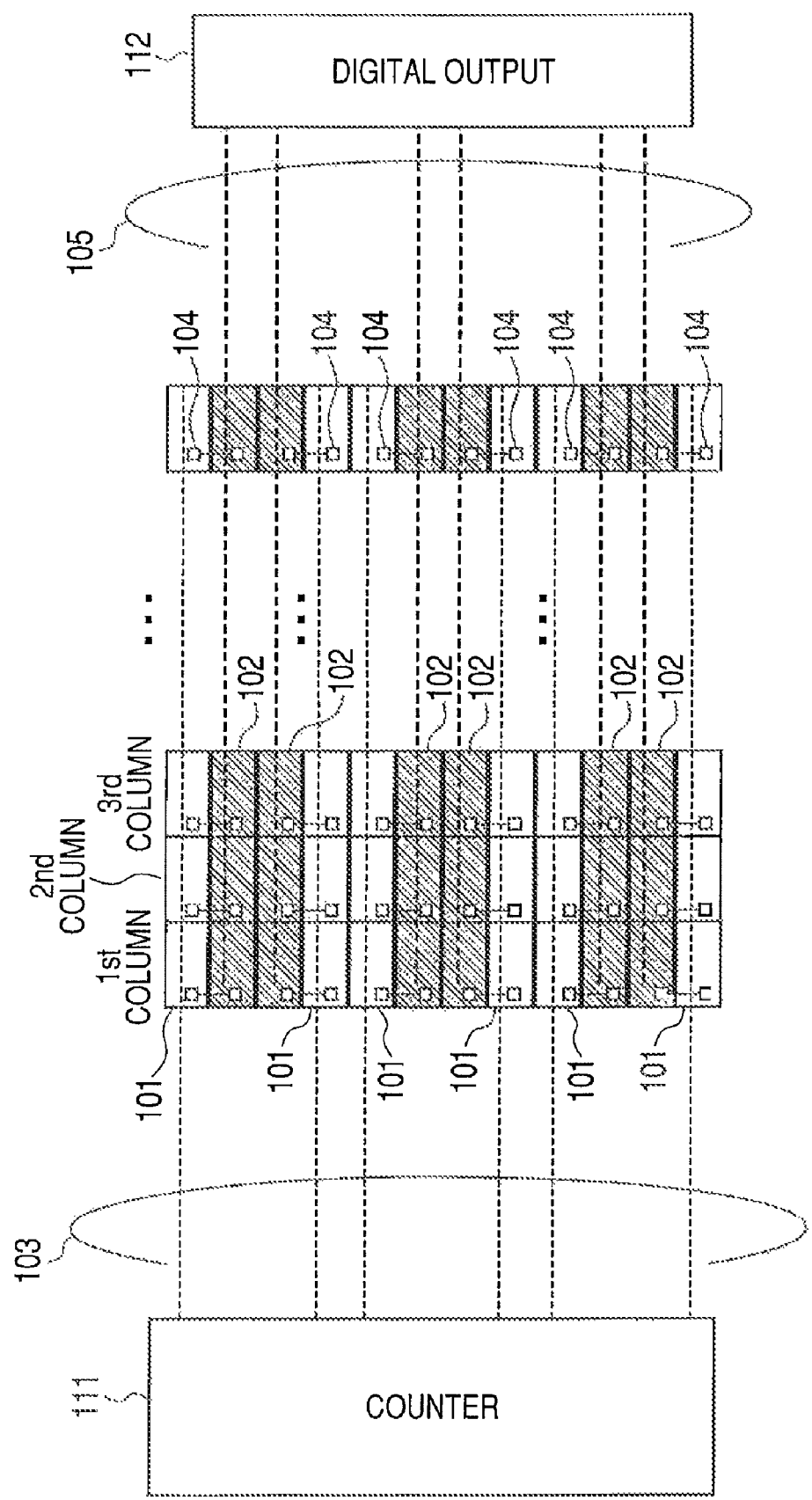
FIG. 4 is a diagram illustrating a configuration example of a third embodiment of the present invention.

FIG. 4 is a diagram illustrating another configuration example of the region A of FIG. 2 according to a third embodiment of the present invention. The same components as those in FIGS. 1 and 2 are shown by the same reference numerals and characters.

An accumulation unit group 1 is provided, in which the first accumulation unit 101 and the second accumulation unit 102 are adjacently arranged in the direction along the column in the arrangement order of the first accumulation unit 101—the second accumulation unit 102 and are paired. An accumulation unit group 2 is provided, in which the first accumulation unit 101 and the second accumulation unit 102 are adjacently arranged in the direction along the column in the arrangement order of the second accumulation unit 102—the first accumulation unit 101. The accumulation unit group 1 and the accumulation unit group 2 are adjacently arranged repeatedly in the arrangement order of the accumulation unit group 1—the accumulation unit group 2, in the direction along the column. Alternatively, the accumulation unit group 2 and the accumulation unit group 1 are adjacently arranged repeatedly in the arrangement order of the accumulation unit group 2—the accumulation unit group 1. By arranging the width of the first accumulation unit 101 and the second accumulation unit 102 within the width of the pixel arrangement pitch, the pixel arrangement pitch in the direction along the row can be easily reduced.

According to the present embodiment, the accumulation unit groups are arranged in the direction along the column, and therefore, the pixel arrangement pitch in the direction along the row can be easily reduced. Patent Document 1 is disadvantageous in high-speed operation, because the data lines branching from the data line from the counter intersect one another as illustrated in FIG. 8, and parasitic capacitance occurs in the intersecting portions of the data lines. Since in the present embodiment, the accumulation unit groups are arranged in the direction along the column, the data lines can connect to the corresponding first accumulation units without intersecting one another, and enhancement in operation speed can be realized.

Fourth Embodiment

Figure 5:
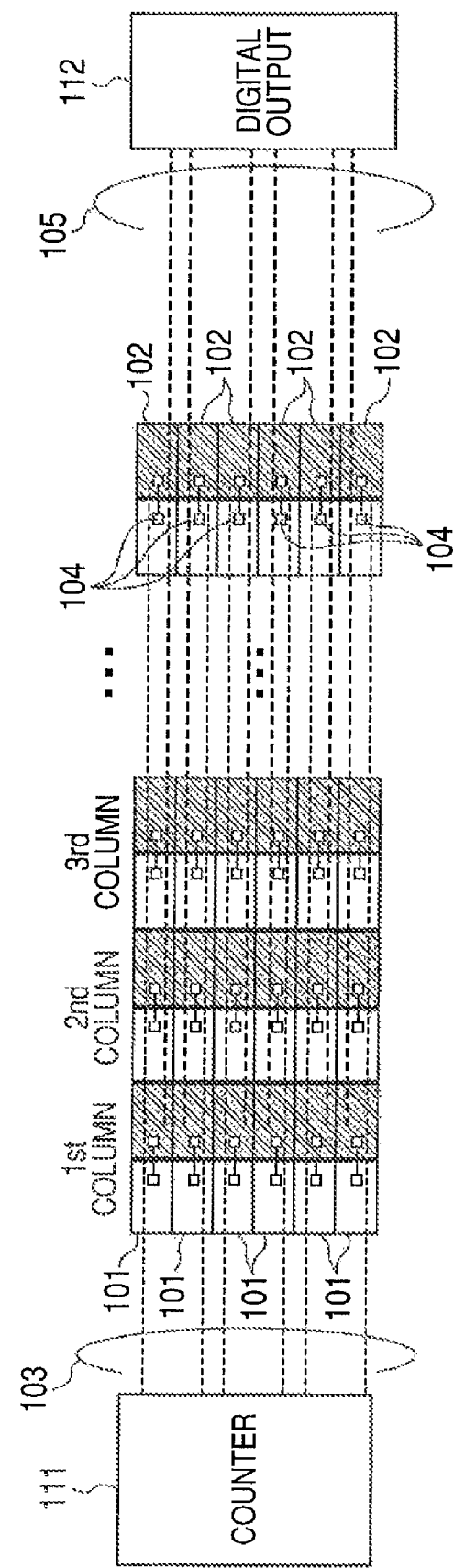
FIG. 5 is a diagram illustrating a configuration example of a fourth embodiment of the present invention.

FIG. 5 is a diagram illustrating another configuration example of the region A of FIG. 2 according to a fourth embodiment of the present invention. The same elements as those in FIGS. 1 and 2 are shown by the same reference numerals and characters.

In the present embodiment, accumulation unit groups each made by the first accumulation unit 101 and the second accumulation unit 102 corresponding to one bit adjacently arranged in the direction along the row and paired, of which number is n, are arranged in the direction along the column. The data lines 103 and the output line 105 are arranged so that the data lines 103 and 105 are connected in the direction along the column in the arrangement order of 103-105-105-103.

The inter-accumulation unit wiring 104 is connected between the first accumulation unit 101 and the second accumulation unit 102 which are adjacent in the direction along the row. The data line 103 is connected to the first accumulation unit 101. The output line 105 is connected to the second accumulation unit 102.

According to the present embodiment, the accumulation unit groups are arranged in the direction along the column, and therefore, the pixel arrangement pitch in the direction along the row can be easily reduced. Patent Document 1 is disadvantageous in enhancement of operation speed because the data lines branching from the data line from the counter intersect one another as illustrated in FIG. 8, and parasitic capacitance occurs in the intersecting portions of the data lines. Since in the present embodiment, the accumulation unit groups are arranged in the direction along the column, the data lines can connect to the corresponding first accumulation units without intersecting one another, and enhancement of the operation speed can be realized.

Figure 6:
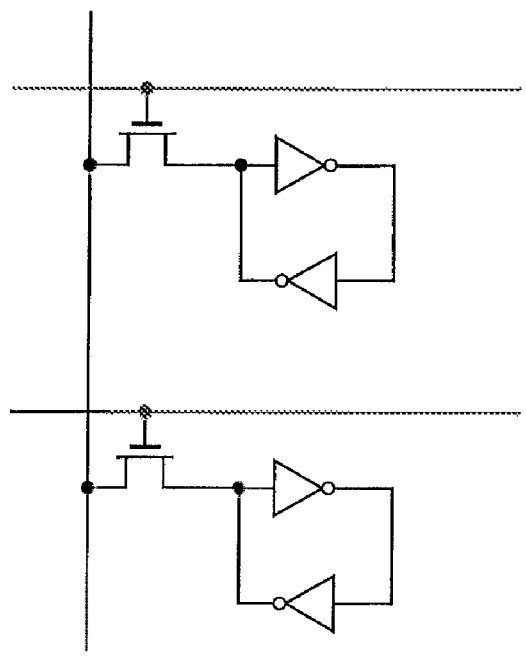
FIG. 6 is a diagram illustrating a configuration example of an accumulation unit according to the present invention.

In the solid-state imaging apparatuses according to the first to fourth embodiments, for the first and second accumulation units, capacitative elements may be used as disclosed in Patent Document 1, or a configuration using a latch circuit may be used. FIG. 6 illustrates a configuration example using a latch circuit as the accumulation unit.

FIG. 6 illustrates a configuration in which the accumulation unit groups of the paired first accumulation units and the second accumulation units are adjacently arranged in the direction along the column. Here, when a signal SH1 is at a high level, the value output to the data line 103 from the counter is held in the first accumulation unit. Further, when signals SH1 and SH2 are at a high-level, the data held in the first accumulation unit is transferred to the second accumulation unit.

Figure 7:
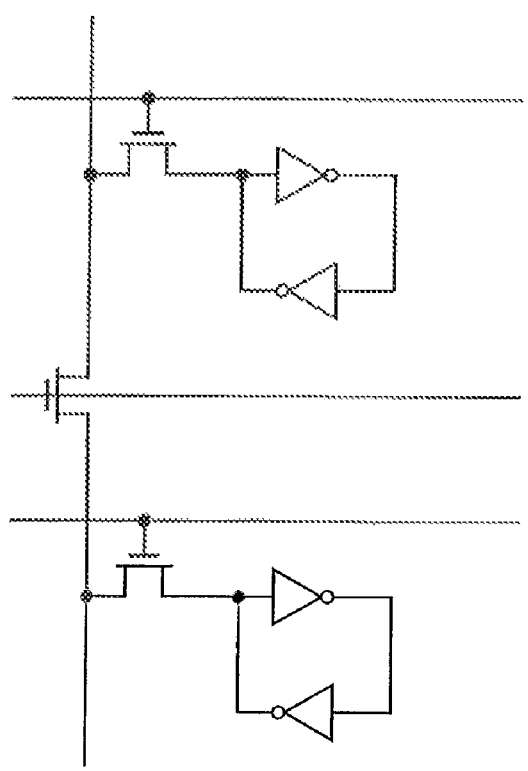
FIG. 7 is a diagram illustrating a configuration example of an accumulation unit according to the present invention.

FIG. 7 is a diagram illustrating still another configuration example, and a switch is added to between the first accumulation unit and the second accumulation unit, with respect to the configuration of FIG. 6.

In the solid-state imaging apparatuses of the first to fourth embodiments, a plurality of pixels 106 are arranged in a two-dimensional array to generate an image signal based on photoelectric conversion. The counter 111 is arranged commonly to a plurality of columns of the pixels 106 to count and output a digital value of n-bits. The first accumulation units 101, of which number is n, are arranged corresponding to each column of the pixels 106, and each of the first accumulation units holds a digital value of one bit among the digital value of n-bits output from the counter 111. The second accumulation units 102 are arranged correspondingly to the first accumulation units, and hold the digital value transferred from the first accumulation units 101. The inter-accumulation unit wiring 104 connects the first accumulation unit 101 and the second accumulation unit 102. The A/D converter 107 inputs the image signal generated by the pixels 106 by row unit. The A/D converter 107 writes the digital value of n-bits from the counter 111 based on the image signal into the first accumulation units 101, of which number is n, for each column of the pixels 106.

The first accumulation unit 101 of m-th ($1 \leq m \leq n$) bit is the first accumulation unit 101 of m-th ($1 \leq m \leq n$) bit among the first accumulation units, of which number is n, arranged for holding the digital value of n-bits. The second accumulation unit 102 of m-th ($1 \leq m \leq n$) bit is the second accumulation unit 102 of m-th ($1 \leq m \leq n$) bit among the second accumulation units 102, of which number is n, arranged for holding the digital value of n-bits. Correspondingly to each column of the pixels 106, the first accumulation unit 101 of m-th ($1 \leq m \leq n$) bit, and the second accumulation unit 102 of m-th ($1 \leq m \leq n$) bit are adjacently arranged and paired. The pairs, of which number is n, are arranged in the direction along the column of the pixels 106.

In FIGS. 1 and 4, the first accumulation unit 101 and the second accumulation unit 102 which are paired are adjacently arranged in the direction along the column of the pixels 106.

In FIG. 4, among the pairs, the pairs of k-th and k+1-th adjacent to the pair of k-th are arranged in a reversed order in a direction along the column, along which the first accumulation units 101 and the second accumulation units 102 forming the pairs of the k-th and k+1-th are adjacent.

Further, in FIGS. 3 and 5, the first accumulation units 101 and the second accumulation units 102 which form the pairs are arranged adjacently in a direction along the row of the pixels 106.

The data line 103 connects the counter 111 and the first accumulation unit 101. The output line 105 is connected to the second accumulation unit 102, and outputs the digital value held by the second accumulation unit 102.

In FIG. 5, among the pairs, the pairs of k-th and k+1-th adjacent to the pair of k-th are arranged in a reversed order in a direction along the column, along which the data line 103 connected to the first accumulation unit 101 which forms each pair and the output line 105 connected to the second accumulation unit 102 are arranged.

During transferring the digital value from the second accumulation unit 102 to the digital output unit 112, the first accumulation unit 101 holds the digital value of n-bits output from the counter 111. After the second accumulation unit 102 completes transfer of the digital value to the digital output unit 112, the digital value held by the first accumulation unit 101 is transferred to the second accumulation unit 102 to hold it therein.

By arranging the first accumulation unit 101 and the second accumulation unit 102, the wirings which connect the counter 111 and a plurality of first accumulation units 101 can be prevented from intersecting one another. Further, the n can be a value of three or larger.

According to the first to fourth embodiment described above, the accumulation unit groups are arranged in the direction along the column, and therefore, the pixel arrangement pitch in the direction along the row can be easily reduced. In particular, when n of the output of n-bits of the counter is three or larger, these embodiments are effective. Patent Document 1 is disadvantageous in high-speed operation because the data lines branching from the data line from the counter intersect one another as illustrated in FIG. 8, and parasitic capacitance occurs in the intersecting portions of the data lines. In contrast with this, in the first to fourth embodiment, the accumulation unit groups are arranged in the direction along the column. Therefore, the data lines can connect to the corresponding first accumulation units without intersecting one another, and enhancement of the operation speed can be realized.

The above described embodiments only show concrete examples in embodying the present invention, and the technical range of the present invention should not be considered as restrictive by these embodiments. Specifically, the present invention may be embodied in various forms without departing from the technical idea or essential characteristics thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-149894, filed Jun. 6, 2008, which is hereby incorporated by reference herein in its entirety.

What is claimed is:

1. A solid-state imaging apparatus comprising:
a plurality of pixels arranged in a matrix; and
column signal processing units each arranged correspondingly to a respective one of columns of the plurality of pixels, for converting a signal outputted from the pixels into an n-bit digital signal, wherein
the column signal processing units comprises n first accumulation units and n second accumulation units, and
the first and second accumulation units of a corresponding bit are paired, such that plural pairs of the first and second accumulation units are arranged in a direction along the columns of the pixels.

2. The solid-state imaging apparatus according to claim 1, wherein
the paired first and second accumulation units are arranged adjacently along the columns of the pixels.

3. The solid-state imaging apparatus according to claim 1, wherein
the paired first and second accumulation units are arranged adjacently along the rows of the pixels.

4. The solid-state imaging apparatus according to claim 3, further comprising
a data line for connecting a counter to the first accumulation units; and
an output line connected to the second accumulation units, to output the digital value held by the second accumulation units,
wherein k-th and k+1-th pairs (k is natural number) are arranged in a reversed order in a direction along the columns of the pixels, along which the data line connected to the first accumulation units and the output line connected to the second accumulation units are arranged correspondingly.

5. The solid-state imaging apparatus according to claim 1, wherein
k-th and k+1-th pairs (k is natural number) are arranged in a reversed order in a direction along the columns of the pixels, along which the first and second accumulation units forming the k-th and k+1-th pairs are adjacent.

6. The solid-state imaging apparatus according to claim 1, wherein,
during transferring the digital value from the second accumulation units to a digital output unit, the first accumulation units hold the digital value of n-bits output from a counter, and,
after completing the transferring the digital value from the second accumulation units to the digital output unit, the digital value held by the first accumulation units is transferred to the second accumulation units to hold the digital value therein.

7. The solid-state imaging apparatus according to claim 1, wherein
wirings for connecting a counter to the plurality of first accumulation units are arranged so as not to cross mutually.

8. The solid-state imaging apparatus according to claim 1, wherein the number n is not smaller than 3.

* * * * *